United States Patent Office.

GEORGE F. WILSON, OF EAST PROVIDENCE, RHODE ISLAND, AND EBEN NORTON HORSFORD, OF CAMBRIDGE, MASSACHUSETTS.

Letters Patent No. 75,337, dated March 10, 1868.

---

IMPROVEMENT IN TREATING THE MIXTURE OF ACID PHOSPHATE OF LIME AND FARINACEOUS MATTERS IN ORDER TO GRANULATE THEM.

---

The Schedule referred to in these Letters Patent and making part of the same.

---

TO ALL WHOM IT MAY CONCERN:

Be it known that we, GEORGE F. WILSON, of East Providence, in the county of Providence, and State of Rhode Island, and EBEN NORTON HORSFORD, of Cambridge, in the county of Middlesex, and State of Massachusetts, have invented a new and improved Method of Treating the Mixture of Acid Phosphate of Lime and Farinaceous Matters, by which it becomes suited to the wants of a pulverulent acid for use in the culinary art; and we hereby declare that the following is a full and exact description thereof.

In the preparation of acid phosphate of lime, when mixed with farinaceous matters in the manner described by GEORGE F. WILSON, in his application for a patent of even date herewith, we have found, by repeated experiments, that there was a tendency in the mass to become too compact or dense to be capable of successful granulation, and also a tendency of the acid in the interior of the lumps to pass to the surface thereof, and there to form a sticky, gummy coating with the farinaceous matter, which becomes brown, thus discoloring the substance, and rendering subsequent treatment, with a view to pulverization, as well as to granulation, difficult, if not impracticable.

To overcome these difficulties, we have found by experiment that by spreading the compound upon drying-platforms in coarse lumps, and exposing the same to the action of light and the atmosphere, at a temperature of about 75° Fahrenheit, and by repeatedly turning over the mass about twice a day for ten or fifteen days, and gradually reducing the size of the lumps each time they are moved, we were able to arrest the formation of this brown sticky coating, as well as the setting or too great hardening of the lumps, and thus bringing the compound to a condition in which it is capable of being granulated by mechanical means, and reduced to particles of proper size for subsequent processes.

What we claim, and desire to secure by Letters Patent of the United States is—

The new and improved process of treating acid phosphate of lime when mixed with farinaceous matters, for the purpose of so drying and ageing the same as to prepare it for the successful application of mechanism for granulation, in the manner substantially as and for the purpose above described.

<div style="text-align:right">GEO. F. WILSON,<br>E. N. HORSFORD.</div>

Witnesses:
WILLIAM HEDGE,
W. H. McGRENERY.